No. 762,381. Patented June 14, 1904.

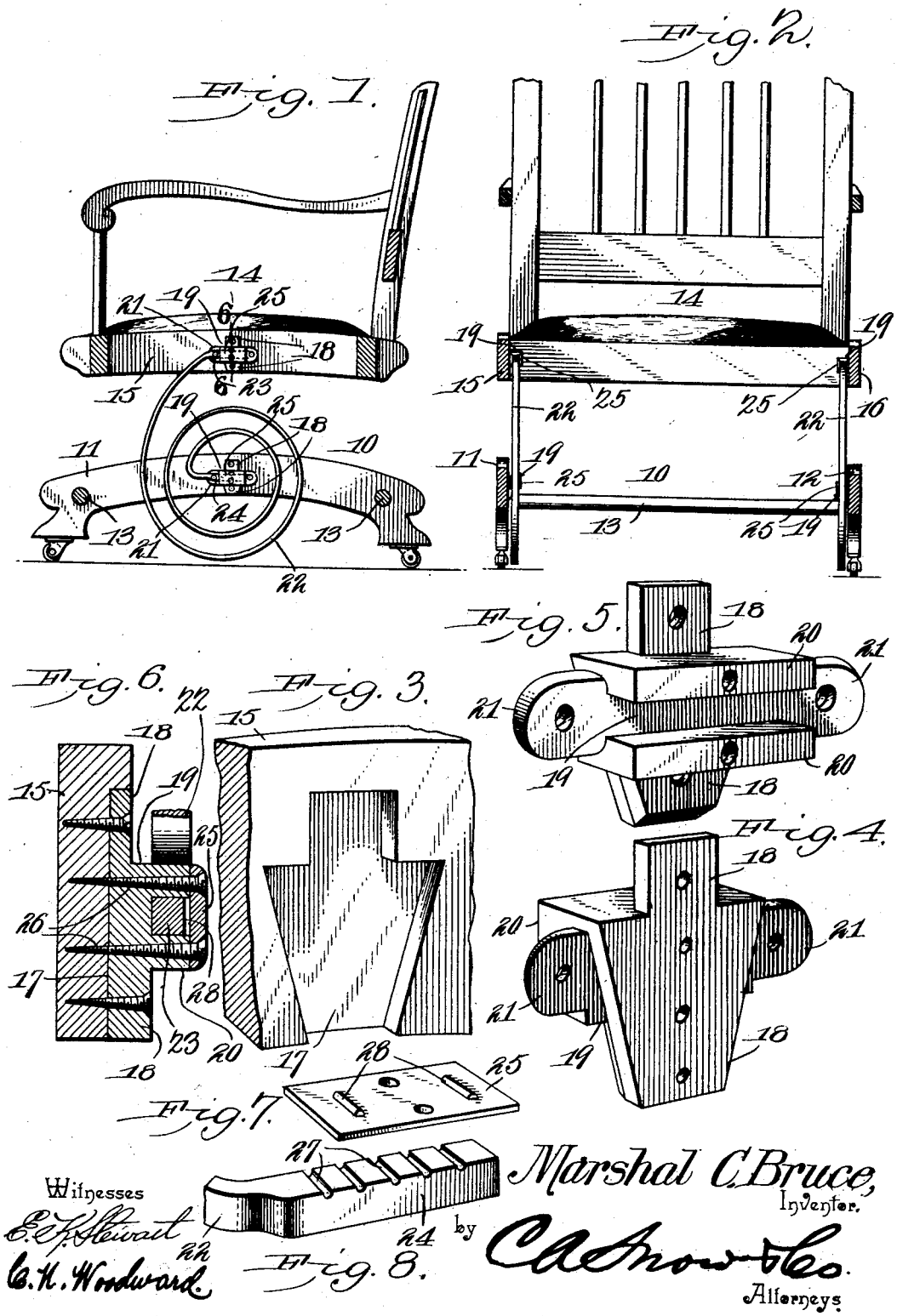

UNITED STATES PATENT OFFICE.

MARSHAL C. BRUCE, OF DEARBORN, MISSOURI.

SPRING FOR ROCKING-CHAIRS OR ANALOGOUS STRUCTURES.

SPECIFICATION forming part of Letters Patent No. 762,381, dated June 14, 1904.

Application filed December 26, 1903. Serial No. 186,683. (No model.)

*To all whom it may concern:*

Be it known that I, MARSHAL C. BRUCE, a citizen of the United States, residing at Dearborn, in the county of Platte and State of Missouri, have invented a new and useful Spring for Rocking-Chairs or Analogous Structures, of which the following is a specification.

This invention relates to spring-supported bodies—such as rocking-chairs and analogous structures, vehicles of various kinds, some forms of cribs, cradles, and the like—and has for its object to provide an improved spring structure and means for connecting the same, respectively, to a base portion and movable body portion, to uniformly distribute the strains and imposed weight, and to cushion the body portion and permit an easy and noiseless rocking or vibratory motion thereof.

A further object of the invention is to provide an improved clip or fastening device between the ends of the spring and the base and body portions and permit a ready attachment and detachment of the parts and insure a rigid and stable connection between them.

With these and other objects in view, which will appear as the nature of the invention is better understood, the same consists in certain novel features of construction, as hereinafter shown and described, and specified in the claims.

The improvements herein shown and described may be employed for connecting two bodies of any desired kind—such as the stationary base and body portions of rocking-chairs, some forms of cribs, cradles, and the like, or connecting the body portions with the running-gear of various forms of vehicles or any structure which requires to be supported for vibration or oscillation; but as the improved device is more particularly applicable to connecting the body portions to the base portions of rocking-chairs it is shown in the drawings thus applied for illustration; but it will be understood that the invention is not to be limited thereto, as the elements therein exhibited may be varied or changed as to shape, proportions, and exact manner of assemblage for the purpose of adapting it to the various structures to which it is applicable without departing from the principle thereof or sacrificing any of its advantages.

In the accompanying drawings, forming a part of this specification, in which corresponding parts are denoted by like designating characters, Figure 1 is a sectional side elevation, and Fig. 2 is a transverse sectional elevation, of a portion of a rocking-chair with the improvements applied. Fig. 3 is a perspective view of a portion of the base portion with the supporting-clip detached. Fig. 4 is a perspective view of one of the spring-supporting clips detached viewed from the rear side, and Fig. 5 is a similar view viewed from the front side with the cap removed. Fig. 6 is a transverse section, enlarged, on the line 6 6 of Fig. 1. Fig. 7 is a perspective view of the keeper-cap detached and reversed. Fig. 8 is a perspective view of the "butt-end" of one of the cushion-springs.

The base portion is represented as a whole at 10 and embraces in its structure spaced side members 11 12 and transverse connecting members 13 and may be of any desired size or material or fanciful design.

The body portion is represented as a whole at 14 and embraces in its structure spaced side members 15 16 and may also be of any desired size or form or fanciful design.

In each of the side members of both the base and body portions, preferably within their inner faces, are formed recesses, one of which is shown at 17 in Fig. 3, with their side walls converging downwardly, and embedded in these recesses are correspondingly-formed projections 18 upon clips 19, the latter each having a socket formed by spaced ribs 20, as shown. The clips 19 have perforated lateral ears 21, through which the holding-screws are inserted into the wooden side members, and similar screws are inserted through the extending ends of the projections 18, as shown. By this means the socketed clips are very firmly secured in the side members and the downward thrust borne entirely by the inclined sides of the recesses and the holding-screws thereby relieved from transverse strains.

The cushion-springs are represented at 22 bent into spiral form, with the ends 23 24 enlarged and rectangular in cross-section and conforming to the cavities or sockets formed between the spaced ribs 20 and into which they fit, as shown. Each of the clips is provided with a cap 25, forming closures to the sockets and holding the spring ends in place therein. The caps are secured by holding-screws 26, which pass through the ribs 20 and into the wooden side members, as shown, thus materially increasing the strength of the connection between the clips and their attachments and the side bars. The spring ends are provided with spaced transverse recesses 27, and the inner faces of the caps 25 are provided with corresponding transverse ribs 28 to engage the recesses, and thus effectually prevent longitudinal movement of the spring ends when the caps are secured in position. By providing a plurality of the recesses, as shown, it is obvious the springs may be adjusted in the socketed clips by merely loosening the cap-holding screws 26 and moving the springs to any required set of the recesses and then retightening the holding-screws and without disturbing the clips or other parts.

It will be obvious by this arrangement of parts that a very simple, strong, and compact device of the character described is produced and whereby the body portion is firmly supported from lateral movement while free to move vertically and rock forwardly and backwardly when pressure is applied, as in the rocking action of the occupant of the chair.

The results are substantially the same when the improved device is applied to vehicles of various kinds, and wherever employed and for whatever purpose the cushion-springs will be very strongly supported and sustained from all movement of its clip-held ends, and a structure thus equipped will withstand very severe strains and long and hard usage without deterioration or the parts becoming loosened or broken. At the same time in event of the breakage or wearing of any of the parts they can be very easily replaced or renewed without detriment to the other parts.

Having thus described the invention, what is claimed is—

1. The combination with a base and a supported member, of a spiral supporting-spring having enlarged reinforced ends provided with vertical grooves in the edges thereof, supporting-clips for said enlarged ends, and clip-plates having ribs to engage the grooves in the same.

2. The combination with a base and a supported member, of a spiral supporting-spring having enlarged reinforced ends provided with grooves in their outer edges, supporting-clips having flanges for the reception between them of the enlarged ends of the spring, cap-pieces having ribs engaging the grooves in the ends of the spring, and securing means for said cap-pieces, said securing means extending through the flanged clips into the body of the base and that of the supported member, respectively.

In testimony that I claim the foregoing as my own I have hereto affixed my signature in the presence of two witnesses.

MARSHAL C. BRUCE.

Witnesses:
  MELVIN L. DIX,
  J. W. GRIST.